United States Patent Office 3,838,147
Patented Sept. 24, 1974

3,838,147
ADENOSINE DERIVATIVES
Rolf Pohlke, Rochus Jonas, Werner Mehrhof, Hans-Jochen Schliep, Karl Heinz Becker, Herbert Nowak, and Zdenek Simane, Darmstadt, Germany, assignors to Merck Patent Gesellschaft mit beschrankter Haftung, Darmstadt, Germany
No Drawing. Filed Apr. 10, 1972, Ser. No. 242,741
Claims priority, application Germany, Apr. 10, 1971, P 21 17 577.9; Feb. 3, 1972, P 22 05 002.8
Int. Cl. C07d 51/54
U.S. Cl. 260—211.5 R                          44 Claims

ABSTRACT OF THE DISCLOSURE

Compounds of the formula

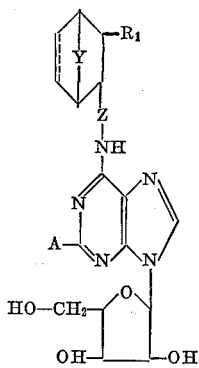

wherein A is H, halogen, $SR_2$, $OR_2$, $N(R_2)_2$, $NH-N(R_2)_2$ or $N_3$; $R_1$ is $CH_2OH$, alkyl or cycloalkyl of up to 6 carbon atoms, $COOR_2$, furyl, tetrahydrofuryl, thienyl, a 5- or 6-membered saturated or unsaturated ring containing one or two nitrogen atoms, or unsubstituted phenyl or phenyl mono-, di- or polysubstituted by one or more of $R_2$, halogen, $OR_2$, $N(R_2)_2$, OAc, NHAc or nitro or monosubstituted by alkylenedioxy; $R_2$ is H or alkyl of up to 4 carbon atoms; Y is $(-CH_2-)_m$ wherein $m$ is the integer 1, 2 or 3, Ac is the acyl radical of a carboxylic acid of up to 6 carbon atoms, and Z is $(-CH_2-)_n$ wherein $n$ is the integer 0, 1 or 2; and the dotted line means a double bond can be present at that position of the molecule, and the therapeutically acceptable salts thereof possess valuable pharmacological properties. More specifically, they have a favourable influence on the transport of oxygen in the blood, i.e. they possess one or more activities selected from increasing the coronary blood flow, increasing the oxygen partial pressure in the coronary venous blood, and improving the circulation. Additionally, they are effective on the lipid metabolism, i.e. they possess one or more activities selected from inhibiting the lipolysis, lowering the level of fatty acids, the level of triglycerides and the level of cholesterol.

Accordingly, the compounds can be employed as pharmaceuticals. For example, they are effective in the endovascular pain model and thus may be used against the pain associated with angina pectoris. They may also be employed in the treatment of arteriosclerosis and hyperlipidemia of different origins. They are also useful as intermediates for the preparation of other drugs and/or other chemical compounds.

BACKGROUND OF THE INVENTION

This invention relates to the novel adenosine derivatives.

SUMMARY OF THE INVENTION

The novel adensoine derivatives of this invention are compounds of the general Formula I

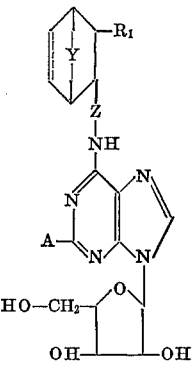

I wherein A is H, halogen, $SR_2$, $OR_2$, $N(R_2)_2$, $NH-N(R_2)_2$ or $N_3$; $R_1$ is $CH_2OH$, alkyl or cycloalkyl of up to 6 carbon atoms, respectively, $COOR_2$, furyl, tetrahydrofuryl, thienyl, a 5- or 6-membered saturated or unsaturated ring containing one or two nitrogen atoms, or unsubstituted phenyl or phenyl mono-, di- or poly-substituted by one or more of $R_2$, halogen, $OR_2$, $N(R_2)_2$, OAc, NHAc or nitro or monosubstituted by alkylenedioxy; $R_2$ is H or alkyl of up to 4 carbon atoms; Y is $(CH_2)_m$ wherein $m$ is the integer 1, 2 or 3, viz., $-CH_2-$, $-CH_2CH_2-$, or $-CH_2CH_2CH_2-$; Ac is the acyl radical of a carboxylic acid of up to 6 carbon atoms; and Z is $(CH_2)_n$ wherein $n$ is the integer 0, 1 or 2, viz., valence bond, $-CH-$ or $-CH_2CH_2-$; and the dotted line means a double bond can be present at that position of the molecule; and the therapeutically acceptable salts thereof. This invention also relates to a process for the production thereof.

The compounds of this invention possess valuable pharmacological properties. More specifically, they have a favourable influence on the transport of oxygen in the blood, i.e. they possess one or more activities selected from increasing the coronary blood flow, increasing the oxygen partial pressure in the coronary venous blood, and improving the circulation. Additionally, they are effective on the lipid metabolism, i.e. they possess one or more activities selected from inhibiting lipolysis, lowering the level of fatty acids, the level of triglycerides and the level of cholesterol.

Accordingly, the compounds can be employed as pharmaceuticals. For example, they are effective in the endovascular pain model and thus may be used against the pain associated with angina pectoris. They may also be employed in the treatment of arteriosclerosis and of hyperlipidemia of different origin. They are also useful as intermediates for the preparation of other drugs and/or other chemical compounds.

DETAILED DISCUSSION

This invention relates to adenosine derivatives of the general Formula I, to their pharmaceutically acceptable salts, and to a process for their production. In preferred aspects, this invention relates to the following classes of compounds within the scope of Formula I wherein radicals which are not otherwise mentioned have the same meaning as in Formula I but wherein:

Ia:
  A=H, Cl, $N(R_3)_2$, $NH-N(R_3)_2$,
  $R_1$=furyl, thienyl or a phenyl, optionally mono-, di- or tri-substituted by one or more of methyl, hydroxy, methoxy, nitro, amino or acetylamino or mono-substituted by methylenedioxy, $R_3$=H, $CH_3$, or $C_2H_5$, and
Z=a valence bond, i.e., n=0;

Ib:
A=H or $NH_2$,
$R_1$=thienyl or phenyl, unsubstituted or substituted by methylenedioxy,
Y=—$CH_2$— or —$CH_2CH_2$—, and
Z=a valence bond, i.e., n=0;

Ic:
A=H,
$R_1$=thienyl or phenyl unsubstituted or substituted by a methylenedioxy,
Y=—$CH_2$—, and
Z=a valence bond, i.e., n=0;

Id:
A=H,
$R_1$=phenyl or thienyl-2,
Y=—$CH_2CH_2$—, i.e., m=2, and
Z=a valence bond, i.e., n=0;

Ie:
$R_1$=alkyl or cycloalkyl of up to 6 carbon atoms, respectively, and
Z=a valence bond, i.e., n=0;

If:
A=H, F, Cl, $SR_2$, $OR_2$, $NH_2$, NH—$NH_2$ or $N_3$,
$R_1$=furyl-2, thienyl-2, or phenyl, unsubstituted or mono- di- or poly-substituted by one or more of halogen, methoxy, nitro, amino, or dimethylamino, or monosubstituted by methylenedioxy, and
Y=—$CH_2$— or —$CH_2CH_2$—, i.e., m=1 or 2;

Ig:
A=H, halogen, $SR_2$, $OR_2$, $N(R_2)_2$, $NHN(R_4)_2$ or $N_3$,
$R_1$=$CH_2OH$, alkyl or cycloalkyl of up to 6 carbon atoms, respectively; $COOR_2$, furyl-3, thienyl-3, tetrahydrofuryl, a 5- or 6-membered saturated or unsaturated ring containing 1 or 2 nitrogen atoms, or a phenyl residue optionally mono- or polysubstituted by $R_4$, $OR_2$, $N(R_4)_2$, OAc, or NHAc, or monosubstituted by the group —O—$R_5$—O—, and, when A=$N(R_4)_2$, also furyl-2, thienyl-2, or phenyl, unsubstituted or mono-, di- or poly-substituted by halogen or nitro,
$R_4$=alkyl of up to 4 carbon atoms,
$R_5$=Y or —$C(R_2)_2$—, and
Z=a valence bond, i.e., n=0;

including as the therapeutically acceptable salts each of the above.

In its process aspect, this invention relates to a process for the production of compounds of Formula I wherein (a) a compound of the general Formula II

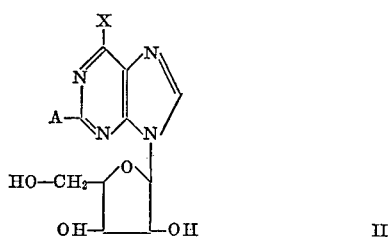

wherein X is F, Cl, Br, I, $SR_6$, $SOR_6$, or $SO_2R_5$, and $R_6$ is alkyl of up to 6 carbon atoms, phenyl or benzyl, and wherein A has the above values given, is reacted with an amine of the general Formula III

wherein $R_1$, Y, and Z have the values given above and the dotted line means a double bond can be present at that position of the molecule; or (b) a compound otherwise corresponding to general Formula I but which carries, in place of one or more H-atoms, groups which can be split off by solvolysis or hydrogenolysis, is treated with an agent having a solvolytic or hydrogenolytic effect; or (c) an adenine derivative of the general Formula IV

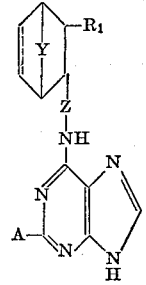

wherein $R_1$, A, Y, and Z have the values given, and wherein the dotted line means a double bond can be present at that position of the molecule, is reacted, in the presence of a condensation agent, with D-ribose or a compound yielding D-ribose; or (d) an adenosine derivative of the general Formula V

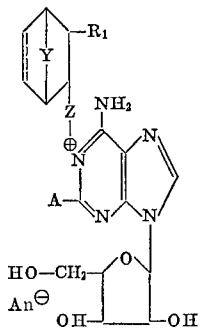

wherein $R_1$, Y, Z, and A have the values given above, $An^-$ is an equivalent of an anion, and wherein the dotted line means a double bond can be present at that position of the molecule, is treated with an alkaline agent; and optionally, a substituent A in the thus-obtained compounds of general Formula I is thereafter converted into another substituent A by treatment with nucleophilic agents; and/or the thus-obtained adenosine derivatives of the general Formula I are converted into the pharmaceutically acceptable salts thereof by means of a corresponding acid.

In Formulae I, III, IV and V, preferably $R_1$ is thienyl, phenyl or phenyl substituted by methylenedioxy. The thienyl group is preferably attached at the 2-position thereof. The methylenedioxy group is preferably located at the 3,4-position of the phenyl ring. $R_1$ can, for example, also be a 5- or 6-membered saturated or unsaturated ring containing one or two nitrogen atoms, e.g., pyrrolyl-2, pyrrolyl-3, pyrrolinyl-2, pyrrolinyl-3, pyrrolidinyl-2, pyrrolidinyl-3, pyrazolyl-2, pyrazolyl-3, imidazolyl-2, imidazolyl-3, pyridyl-2, pyridyl-3, pyridyl-4, piperidyl-2, piperidyl-3, piperidyl-4; pyridazyl-3, pyridazyl-4, pyridazyl-6, pyrimidyl-2, pyrimidyl-4, pyrimidyl-5, pyrazinyl-2 or pyrazinyl-3. When $R_1$ is furyl or tetrahydrofuryl, the heterocyclic ring can be attached at the 2- or 3-position. $R_1$ can also be alkyl or cycloalkyl of up to 6 carbon atoms, e.g., methyl, ethyl, propyl, isopropyl, and the various isomers of butyl, pentyl and hexyl, cyclobutyl, cyclopentyl and cyclohexyl. $R_1$ can also be a mono-, di- or poly-substituted phenyl, e.g., o-methyl-, m-methyl-, p-methyl-, 2,3- (or 2,4-; 2,5-; 2,6-; 3,4-; 3,5-) dimethyl-, 2,3,4- (or 3,4,5-; 2,4,6-; 2,4,5-; 2,3,5-) trimethyl-phenyl, or the corresponding higher alkyl substituents, e.g., ethyl, propyl, isopropyl, and the various butyl groups; 2-chloro-, 3-chloro-, 4-chloro-, 2,4-dichloro-, 3,4-dichloro-, 3,5- dichloro-, 2,4,6-trichlorophenyl, of the corresponding residues substituted by fluorine, bromine or iodine; 2-, 3-, or 4- hydroxy-, 2,4-dihydroxy-, 3,4-dihydroxy-, 3,5-dihydroxy-, 2,4,6-trihydroxy-, 2,3,4-trihydroxy-, 3,4,5-trihydroxy-phenyl; 2-, 3-, or 4-methoxy-, 2,4-dimethoxy-, 3,4-dimethoxy-, 3,5-dimethoxy-, 2,4,6-trimethoxy-, 2,3,4-trimethoxy-, 3,4,5-trimethoxy-phenyl, or the corresponding ethoxy propoxy, isopropoxy, n-butoxy, sec.-butoxy, isobutoxy, or tert.-butoxy substituted groups; o-, m- or p-nitrophenyl or 2,4-dinitrophenyl; o-, m-, or p-aminophenyl, 2,4- or 3,4-diaminophenyl, 2,4,6- or 3,4,5-triaminophenyl; o-, m-, or p-dimethylaminophenyl, 2,4- or 3,4-bis(dimethylamino)phenyl, 2,4,6- or 3,4,5-tris(dimethylamino) phenyl, or the corresponding groups substituted with higher alkyl on the nitrogen atom, e.g., ethyl, propyl, isopropyl, or the various butyl groups.

$R_2$ preferably is H or methyl. It can also be, e.g., ethyl, propyl, isopropyl, n-butyl, sec.-butyl, isobutyl, or tert.-butyl.

$R_1$ in Formula If preferably is unsubstituted phenyl. It can also be, for example, mono- or polysubstituted phenyl, e.g., 2-fluoro-, 2-chloro-, 3-fluoro-, 3-chloro-, 4-fluoro-, or 4-chlorophenyl, 2,4- (or 3,4-) difluoro- or 2,4- (or 3,4-) dichlorophenyl, 2-, 3-, or 4-methoxyphenyl, 2,4-dimethoxyphenyl, 3,4-dimethoxyphenyl, 2,4,6- (or 3,4,5-) trimethoxyphenyl, 2-, 3-, or 4-nitrophenyl, 2,4-dinitrophenyl, 2-, 3-, or 4-aminophenyl, 2-, 3-, or 4-dimethylaminophenyl, 2,4-diaminophenyl, or 2,4,6-triaminophenyl. The methylenedioxy substituent is preferably at the 3,4-position of the benzene ring.

Y is preferably of $-CH_2-$ and $-CH_2-CH_2-$, i.e., $m$ is 1 or 2.

Ac can, e.g., be alkanoyl, preferably acetyl. Z is preferably a valence bond, i.e., $n$ is 0.

$R_6$ which is preferably methyl, can also be, e.g., ethyl, propyl, isopropyl, n-butyl, isobutyl, sec.-butyl, tert.-butyl, n-amyl, isoamyl, pentyl-2, pentyl-3, neopentyl, 3-methylbutyl-2, 2-methylbutyl-1, tert.-amyl, n-hexyl, isohexyl and hexyl-2.

Among the compounds I which carry, in place of H-atoms, groups which can be split off by solvolysis, the following are examples: (a) compounds otherwise corresponding to Formula I having acyl, e.g. acetyl, propionyl or benzoyl, on one or more hetero atoms; or having norcamphanyl-2-carbonyl substituted by $R_1$ in the 3-position, or bicyclo[2,2,2]octyl - 2 - carbonyl, formyl, butyryl, isobutyryl, valeryl, isovaleryl, caproyl, trifluoroacetyl, trichloroacetyl, toluyl, p-nitrobenzoyl, methanesulfonyl and p-toluenesulfonyl on one or more heteroatoms.

(b) compounds having ether groups on the oxygen atoms of the sugar residue, e.g., triphenylmethyl ether groups, or cyclic ether groups, or acetal groups (preferably in the 2',3'-position), particularly isopropylidene and benzylidene groups.

Examples for groups which can be split off by hydrogenolysis are O-aralkyl, e.g., O-benzyl and O-(p-nitrobenzyl); Cl, Br, I, $SR_6$, $SOR_6$ and/or $SO_2R_6$ groups in the 2- and/or 8-position; an amino or carbobenzoxy (benzyloxycarbonyl) or tert.-butyloxycarbonyl group on an $-NH-$ group. Among the $SR_6$ residues, the $SCH_3-$, $SC_2H_5-$, and S-benzyl residues are preferred.

In compounds of Formula V, the $An^\ominus$ residue can be an equivalent of an anion of any desired inorganic or organic acid, e.g., of hydrochloric, hydrobromic, or hydriodic acid. Preferably, $An^\ominus$ is $Cl^\ominus$.

The adenosine derivatives of Formula I are preferably produced from the ribofuranosylpurine derivatives II and the amines III. This reaction can be conducted, for example, in the melt. Temperatures of between 70 and 160° C. generally are employed, between 100 and 150° C., particularly between 120 and 140° C., being preferred. The reaction times are usually between 2 and 100 hours, preferably between 3 and 12 hours. To increase the yield, a base, e.g., an amine, preferably tertiary, e.g., triethylamine, for example, can be added to the reaction mixture. In this case, temperatures of below 100° C. are preferably employed, more preferably between 70 and 85° C. It is also possible to operate under pressure in an autoclave. In this case, the reaction can be terminated in one hour or less. For purposes of working up the reaction mixture, the cooled melt can be dissolved in a suitable solvent, e.g., dioxane, dimethylformamide or tetrahydrofuran, the solution is filtered to remove insoluble materials and the solvent is then removed. The remainder is taken up, for example, in a suitable solvent, e.g., ether, dichloromethane, carbon tetrachloride, or preferably chloroform, and extracted with water which optionally can contain a small amount of acetic acid. The products can be characterized by melting point (insofar as determinable), optical rotation, molecular weight, IR spectrum, and $R_F$ value.

The reaction of compounds II and III can also be conducted in the presence of a solvent, e.g., dimethylformamide, dioxane, tertahydrofuran, methanol, ethanol, propanol, n-butanol, isobutanol, sec.-butanol, tert.-butanol, and in the presence of higher alcohols, preferably, however, in the presence of isopropanol. Mixtures of these solvents are likewise utilized, for example a 1:1 mixture of dimethylformamide and isopropanol. Suitably, the reaction is conducted in the presence of an inorganic or organic base, e.g., pyridine or preferably triethylamine. An excess of the amine III can be employed. The reaction is usually conducted at temperatures of between 0 and 180° C., preferably at the boiling point of the solvent employed. The reaction times usually range between 3 and 30 hours, preferably between 6 and 12 hours. The reaction can also be conducted at about room temperature, in which case a longer reaction time, for example up to 4 days, is usually employed.

The compounds of Formula I can also be obtained by treating a compound otherwise corresponding to Formula I which carries, in place of one or more hydrogen atoms, groups which can be split off by solvolysis or hydrogenolysis employing agents having a salvolytic or hydrogenolytic effect.

The customary agents splitting off acyl groups are usually employed as agents having a solvolytic effect, including both acidic and alkaline reagents. Suitable acids are, for example, aqueous hydrochloric and sulfuric acid. Advantageously, alkali or alkaline earth metal alcoholates, e.g., sodium methylate, potassium methylate, calcium methylate, strontium methylate, or barium methylate; sodium ethylate or potassium ethylate can be used, and also sodium or potassium hydroxide or carbonate and ammonia. Among these agents, sodium methylate and ammonia are preferred. The reaction is conducted, for example, in an inert solvent, e.g., a lower alcohol, including methanol, ethanol and isopropanol, a hydrocarbon, e.g., benzene, toluene, xylene, preferably a mixture of these solvents with water. Suitably, the reaction is conducted under gentle conditions e.g., at between 0° C. and room temperature for from one hour to several days, preferably about 24-48 hours. However, it is also possible to conduct the reaction under heating, e.g., at the boiling point of the solvent employed in which case the reaction normally is conducted for a shorter period of time, e.g., about ½ minute to 2 hours, preferably between 30 and 90 minutes. The working-up procedure can be effected, when using ammonia as the saponification agent, by evaporation and taking the mixture up in a suitable solvent. When using another alkaline deacylating agent, the alkaline reaction solution can first be neutralized, e.g., by the addition of an equivalent amount of acetic acid or, in the case of barium methylate, by the introduction of $CO_2$ into the reaction solution. The subsequent working-up process can, for example, be effected as set forth hereinabove.

If cyclic ether or acetal groups are to be split off at the sugar moiety, acidic solvolytic agents are advantageously utilized. Such agents include aqueous mixtures of inorganic or organic acids, e.g., sulfuric acid, phosphoric acid, hydrochloric acid, hydrofluoric acid, hydrogen bromide, perchloric acid, formic acid, acetic acid, propionic acid, oxalic acid, citric acid, etc. Preferred are 60–90% formic and acetic acid solutions, or highly diluted sulfuric acid or hydrochloric acid. Normally, the reaction is conducted at temperatures of between 0 and 120° C., preferably at about room temperature, for rather long reaction periods, e.g., 5 hours to 2 days. However, the reaction can also be effected at higher temperatures, e.g., at 100° C., usually employing shorter reaction times, e.g., between 0.5 and 120 minutes, preferably about 30 minutes. Especially when using mineral acids, temperatures of 100° C. and reaction times of about a few minutes are preferred.

The removal of groups which can be split off by hydrogenolysis is advantageously accomplished by catalytically activated hydrogen. If the groups to be split off do not contain sulfur, the customary catalysts can be used, preferably the noble metals. Copper-chromium oxide, as well as nickel and cobalt catalysts can also be employed. The noble metal catalysts can be used, preferably as supported catalysts, e.g., palladium on charcoal, the oxide catalysts, e.g., platinum oxide, and the finely divided metallic catalysts, e.g. platinum black. Nickel and cobalt catalysts are suitably employed as the Raney metals. Nickel is also utilized on kieselguhr or pumice as the support. The reaction is effected under normal pressure and at room temperature, or under elevated pressure, e.g., up to about 200 atmospheres and/or elevated temperature, e.g., up to about 200° C. Inert solvents are utilized, preferably methanol, ethanol, isopropanol, tert.-butanol, ethyl acetate, dioxane, tetrahydrofuran, water and mixtures thereof.

Of the groups which can be split off by hydrogenolysis, sulfur-containing groups ($A=SR_2$) can also be present in starting compounds which correspond to Formula I. In this case, Raney catalysts are used for the splitting-off process, e.g., Raney nickel or Raney cobalt, in lower alcohols, e.g., methanol, ethanol, n-propanol and isopropanol. The reaction times in this reaction generally range between 20 minutes and 15 hours, preferably from 4 to 8 hours. Temperatures of between 0 and 120° C. are usually used, preferably the boiling temperature of the solvent employed.

The hydrogenolysis with Raney metals in alcohols can also be applied to the splitting off of groups which do not contain sulfur, for example to splitting off 2-bromo- and 2-iodo- substituents in the purine residue. Also, the conversion of hydrazino- or azido- groups into amino-groups is effected by this reduction method.

The starting materials for the above-described reaction can be obtained in various ways. For example, N(6)-(3-phenyl-norcamphanyl-2)-adenine derivatives, substituted in the 9-position by an equivalent of a silver or mercury atom or by trimethylsilyl, can be reacted with a 1-halogen derivative of D-ribose whose remaining hydroxy groups are masked, preferably 2,3,5-trio-O-acetyl-D-ribofuranosyl chloride, thus obtaining the N(6)-(3-phenyl-norcamphanyl-2)-adenosine provided with blocking groups on the sugar moiety.

It is also possible to employ the so-called fusion method, by reacting, for example, N(6)-(3-phenyl-norcamphanyl-2)-adenine with 1,2,3,5-tetra-O-acetyl-D-ribofuranose in the presence of an acidic catalyst, e.g., p-toluenesulfonic acid, in the melt. This method can also be used for the preparation of adenosine derivatives substituted in the 2-position, e.g., 2'-, 3'-, 5'-tri-O-acetyl-N(6)-(3-phenyl-norcamphanyl-2)-2-chloroadenosine.

Another method for the preparation of N(6)-(3-phenyl-norcamphanyl-2)-adenosine derivatives provided with blocking groups at the sugar is reacting 2',3',5'-tri-O-acetyl-adenosine or an adenosine derivative provided with other blocking groups at the sugar residue, with compounds of Formula VI

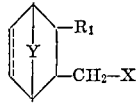

VI wherein $R_1$, X, and Y have the values given above and the dotted line means a double bond can be present at the position, under similar conditions as described above in the reaction of compound II with compound III. In this procedure, the N(1)-alkyl derivatives are first obtained which can then be rearranged, as set forth hereinbelow, in the presence of alkaline agents, preferably ammonia or alcoholic sodium hydroxide solution, into compounds I (with or without a blocking group).

In a variation of this method, the same adenosine derivatives are employed as the starting materials and are reacted with compounds of Formula VII

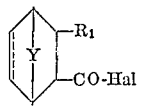

VII wherein $R_1$ and Y have the values given above, Hal is Cl, Br or I, and the dotted line means a double bond can be present at that position. The thus-obtained N(6)-acyl derivatives are subsequently reduced with a complex hydride, e.g., lithium aluminum hydride. Free adenosine can also be reacted with 4 mols of a compound VII wherein Hal=Cl and treating the thus-obtained product with lithium aluminum hydride. In this process, the CO-group, and simultaneously the acyl groups on the sugar moiety are split off reductively.

According to a further method, 2', 3', 5'-tri-O-acetyl-N(6)-(3-phenyl-norcamphanyl-2) - adenosine derivatives are obtained by reacting 1-(2',3',5'-tri-O-acetyl-D-ribofuranosyl)-4-cyano-imidazole5-amine with orthoformic acid triethyl ester and then conducting a ring closure in the presence of an amine of Formula III.

The desired 2',3',5'-tri-O-acetyl-N(6)-(3-phenyl-norcamphanyl-2)-adenosine derivatives are obtained by the reaction of 4-(3-phenyl-norcamphanyl-2-amino)-6-[2',3',-5' - tri-O-acetyl-D-ribofuranosyl-(1)-amino]-pyrimidine-5-amine with methyl formate.

The same reactions can, of course, also be conducted with compounds wherein the hydroxy groups of the sugar residue are blocked by other groups, e.g., isopropylidene groups or benzylidene groups.

The adenosine derivatives I can also be obtained by reacting compounds of Formula IV with D-ribose or a compound yielding D-ribose in the presence of a condensation agent. In this connection, microbiological or phosphate-containing organic condensation agents are suitably utilized.

An example of a microbiological condensation agent is submerse cultures of Bacillus subtilis, especially the strain ATCC 13952. Advantageously, nutrient solutions are employed which contain all of the carbon and nitrogen sources suitable for the growth of the microorganism used and for the enzymatic conversion in appropriate amounts and quantitative proportions, and to which have furthermore been added the customary salts (phosphates, sulfates, trace elements) and effective agents (vitamins) and/or complex substrates (yeast extract, meat extract). The pH of the reaction broth can vary between 5 and 9 and is preferably between pH 6.5 and 7.5. The process is carried out at temperatures of between 20 and 40° C., preferably between 25 and 35° C. During the reaction, the reaction broth suitably is aerated. The starting substance can be added to the reaction broth already upon inoculation or, preferably, also at a later time, for example after 20 hours. As compounds yielding D-ribose, suitable are all carbon and/or nitrogen sources customarily utilized in the growth of microorganisms, including as carbon sources, glucose, galactose, mannose, fructose, saccharose, glycerin, potato starch, corn steep liquor, malt extract (maltose), molasses, peptones, pectins, yeast extracts, and beet chips; and as nitrogen sources, amino acids, peptones, yeast extracts, albumen and soybean oil meal. The reaction can also be conducted with a suspension of organisms which were grown and then centrifuged or filtered and optionally washed, in water or a buffer solution under the above-described conditions (pH, air, temperature). For isolating purposes, the reaction mixture is preferably extracted with a suitable solvent, for example dichloromethane, chloroform or ether.

The joining of D-ribose to an adenine derivative of Formula IV can also be effected in the presence of a phosphate-containing organic condensation agent, e.g., phenyl polyphosphate. The process is effected, for example, by the addition of an acidic catalyst, preferably an inorganic mineral acid, e.g., hydrochloric acid, in an organic inert solvent, e.g., dimethyl sulfoxide or preferably dimethylformamide. During the reaction, the adenine derivative IV is first heated for a short time together with the polyphosphate to temperatures of between 30 and 70° C., preferably to 50° C., the dissolved sugar is added thereto, the solvent is removed, and the residue is then heated for a few minutes, preferably about 10 minutes, to 50–120° C., preferably 70–90° C. The reaction mixture is worked up by neutralization, preferably by the use of ion exchangers.

The adenosine derivatives I can also be obtained by reacting the adenosine derivatives V, substituted in the 1-position, with alkaline agents. Suitable alkaline agents are inorganic bases, e.g., optionally dilute aqueous solutions of alkali, alkaline earth or heavy metal hydroxides, e.g., sodium or potassium hydroxide, sodium or potassium carbonate or preferably ammonia, and organic bases, e.g., as aniline and triethylamine. The reaction is conducted in a suitable solvent, e.g., water, a lower alcohol, e.g., methanol, ethanol, isopropanol, tetrahydrofuran, dioxane or a mixture thereof, at a temperature of between 0 and about 100° C., preferably at 65–90° C., for about ½ to 5 hours, preferably about 2 hours.

The starting compounds of Formula V can be produced by reacting adenosine or the derivatives thereof, which can be provided with a temporary blocking group, with alkylating agents of Formula VI.

A preferred variant of this process resides in not isolating the compounds V, e.g., starting with adenosine and compounds VI, by adjusting the pH of the thus-produced solution of compounds V to an alkaline pH and heating this solution for a short time. In this way, compounds I are produced directly.

In the thus-obtained compounds of Formula I, the substituent A can, if desired, be exchanged by another substituent A by treatment with a nucleophilic agent. This can be done preferably with compounds I wherein A=Cl. These compounds are treated, for instance, with a nucleophilic compound of Formula VIII Me—Q (VIII) wherein Me is H or an equivalent of an alkali, alkaline earth, or heavy metal atom, and Q is F, Br, I, SR$_2$, OR$_2$, N(R$_2$)$_2$, NH—N(R$_2$)$_2$, or N$_3$, employing a suitable solvent.

Compounds I wherein A=NH—NH$_2$ or —N$_3$ are obtainable, for example, by reacting the corresponding chloro compound in an inert solvent, e.g., dimethylformamide, tetrahydrofuran, or dioxane, with hydrazine hydrate or with sodium azide, optionally in an autoclave. The reaction is usually terminated after about 12 hours.

The more strongly basic of the compounds I can optionally be converted into the therapeutically acceptable acid addition salts thereof by treatment with pharmaceutically acceptable acids. Suitable in this connection are, in particular, the 2-hydrazino compounds of Formula I. For purposes of salt formation, one employs, for example, inorganic acids or organic carboxylic or sulfonic acids, e.g., hydrochloric acid, hydrobromic acid, sulfuric acid, malonic acid, succinic acid, maleic acid, citric acid and methanesulfonic acid.

The compounds of Formula I contain several asymmetrical carbon atoms in the ribose residue and are therefore optically active. Isomerism can also exist due to the fact that the bicyclic substituent on the N(6)-atom of the adenosine residue contains further asymmetrical carbon atoms. Therefore, within the scope of Formulae I and Ia–Ig are included all compounds which are stereoisomeric in the N(6)-substituent.

To obtain one or several of these stereoisomers in accordance with the methods described above, it is possible to use starting substances, especially amines of Formula III, which either are racemic or optically active. Thus, it is possible, for example, to react a compound of Formula II, which is always optically active, with a racemic or optionally active amine of Formula III.

In the synthesis of the amine III by the Diels-Alder synthesis, one of the isomers thereof frequently is obtained in excess and can be isolated in the pure form by following the known methods of isomer separation. If III is present, as a racemate, it can be separated into the optical antipodes thereof by conventional, preferably chemical, methods.

The novel compounds can be used in a mixture with solid, liquid, and/or semiliquid excipients as drugs in the human or veterinary medicine. Suitable vehicles are those organic or inorganic substances suitable for parenteral or enteral (peroral or rectal) administration and which do not react with the novel compounds, such as, for example, water, glycerin, vegetable oils, natural or synthetic triglycerides, e.g., coconut oil, benzyl alcohols, polyethylene glycols, suitable higher fatty alcohols, gelatin, cellulose derivatives, lactose, amylose, such as potato starch, corn starch, amylopectin, saccharose, sorbitol, mannitol, furthermore pulverized laminaria, powdered citrus pulp, magnesium stearate, talc, gum arabic, titanium dioxide, vaseline, cholesterol. For parenteral application, solutions are primarily employed, preferably oily or aqueous solutions, as well as suspensions, emulsions, or implants. Liquids are advantageously packaged in ampoules. Suitable for enteral application are tablets, dragees, capsules, syrups, elixirs, or suppositories. The above-mentioned preparations can be optionally sterilized or mixed with auxiliary agents, such as lacquers, lubricants, preservatives, stabilizers, or wetting agents, solubilizers, emulsifiers, plasticizers, salts for influencing the osmotic pressure, buffers, sweetening, coloring, flavoring and/or aromatous agents.

N(6) - (3 - phenyl - bicyclo[2,2,2]octyl - 2) - adenosine, when administered intravenously in a dose of 0.1–0.5 mg./kg. exhibits very good coronary-dilating activity of sufficient intensity and duration. It is also effective in lowering the arterio-venous oxygen difference (AVDO$_2$).

In an endovasal pain model in an anesthetized dog according to the procedure of Lim [K .S. Lim, Annals of the New York Academy of Sciences, Vol. 86, pp. 72–89 (1960)], N(6) - (3-phenyl-bicyclo[2,2,2]octyl-2)-adenosine induces after an intravenous dose of 0.1–1.0 mg./kg. of body weight, a suppression of 80–100% of the pain for 30–180 minutes.

The compounds of this invention are administered intravenously or orally to animals preferably in a dose of from 0.01–100 mg., preferably from 0.05–10 mg. per kg. of body weight. In humans, the doses are chosen accordingly.

Without further elaboration, it is believed that one skilled in the art can, using the preceeding description, utilize the present invention to its fullest extent. The following preferred specific embodiments are, therefore, to be construed as merely illustrative, and not limitative of the remainder of the disclosure in any way whatsoever.

EXAMPLE 1

5.6 g. of 6-chloro-9-(β-D-ribofuranosyl)-purine and 4.0 g. of 3-phenyl-norcamphanyl-2-amine are allowed to stand for 4 days at room temperature in 90 ml. of dimethylformamide and 90 ml. of isopropanol with the addition of 10 ml. of triethyl amine. After evaporation of the solvent, the mixture is taken up in chloroform and extracted with 1% strength acetic acid. After removal of the chloroform, the residue is triturated with ether. Solid, but noncrystalline N(6)-(3)-phenyl-norcamphanyl-2)-adenosine is obtained; m.p. between about 85 and 100° C., mostly at about 90° C. The product, is a thin-layer chromatogram (silica gel plate), exhibits an $R_F$-value of 0.25 (eluent chloroform:methanol=95:5); $[\alpha]_D^{20}$ —42.8° (chloroform), —55.2° (methanol).

Analogously, the adenosine compounds listed below are produced from the 6-chloro- and 6-bromo-derivatives, respectively, of 9-($\beta$-D-ribofuranosyl)-purine and the derivatives thereof substituted in the 2-position with the corresponding amino derivatives of norcamphane or bicyclo[2,2,2]octane substituted in the 3-position or bicyclo-[3,2,2]nonane substituted in the 7-position.

N(6)-[3-(furyl-2)-norcamphanyl-2]-adenosine, m.p. 105–120° C. (softening); $R_F$-value 0.55 (eluent chloroform:methanol=9:1); $[\alpha]_D^{20}$ —50.3° (ethanol), —43.6° (chloroform)
N(6)-[3-(tetrahydrofuryl-2)-norcamphanyl-2]-adenosine
N(6)-[3-(furyl-3)-norcamphanyl-2]-adenosine
N(6)-[3-(tetrahydrofuryl-3)-norcamphany-2]-adenosine
N(6)-[3-(thienyl-2)-norcamphanyl-2]-adenosine, m.p. 118–130° C. (softening); $[\alpha]_D^{20}$ —46.9° (methanol), —42.6° (chloroform)
N(6)-[3-(thienyl-3)-norcamphanyl-2]-adenosine
N(6)-[3-(pyridyl-2)-norcamphanyl-2]-adenosine
N(6)-[3-(pyridyl-3)-norcamphanyl-2]-adenosine
N(6)-[3-(pyridyl-4)-norcamphanyl-2]-adenosine
N(6)-[3-(piperidyl-2)-norcamphanyl-2]-adenosine
N(6)-[3-(piperidyl-3)-norcamphanyl-2]-adenosine
N(6)-[3-(piperidyl-4)-norcamphanyl-2]-adenosine
N(6)-[3-(o-tolyl)-norcamphanyl-2]-adenosine, m.p. 95–115° C. (softening); $[\alpha]_D^{20}$ —49.8° (methanol)
N(6)-[3-(m-tolyl)-norcamphanyl-2]-adenosine
N(6)-[3-(p-tolyl)-norcamphanyl-2]-adenosine, m.p. 126–129° C. (softening point)
N(6)-[3-(2,3-dimethylphenyl)-norcamphanyl-2]-adenosine
N(6)-[3-(2,4-dimethylphenyl)-norcamphanyl-2]-adenosine
N(6)-[3-(2,4,6-trimethylphenyl)-norcamphanyl-2]-adenosine
N(6)-[3-(3,4,5-trimethylphenyl)-norcampanyl-2]-adenosine
N(6)-[3-(o-fluorophenyl)-norcamphanyl-2]-adenosine
N(6)-[3-(p-chlorophenyl)-norcamphanyl-2]-adenosine
N(6)-[3-(2,4-dichlorophenyl)-norcampnanyl-2]-adenosine
N(6)-[3-(2,4,6-trichlorophenyl)-norcamphanyl-2]-adenosine
N(6)-[3-(p-methoxyphenyl)-norcamphanyl-2]-adenosine
N(6)-[3,4-dimethoxyphenyl)-norcamphanyl-2]-adenosine, m.p. 100–120° C. (softening); $R_F$-value 0.56 (eluent chloroform:methanol=9:1); $[\alpha]_D^{20}$—39.4° (chloroform)
N(6)-[3-(3,4,5-trimethoxyphenyl)-norcamphanyl-2]-adenosine, m.p. 80–100° C. (softening); $[\alpha]_D^{20}$ —37.1° (methanol), —41.3° (chloroform)
N(6)-[3-(2,4,6-trimethoxyphenyl)-norcamphanyl-2]-adenosine
N(6)-[3-(p-hydroxyphenyl)-norcamphanyl-2]-adenosine
N(6)-[3-(3,4-dihydroxyphenyl)-norcamphanyl-2]-adenosine m.p. 130–143° C. (softening); $[\alpha]_D^{20}$ —48.7° methanol)
N(6)-[3-(2,4,6-trihydroxyphenyl)-norcamphanyl-2]-adenosine
N(6)-[3-(o-nitrophenyl)-norcamphanyl-2]-adenosine
N(6)-[3-(m-nitrophenyl)-norcamphanyl-2]-adenosine
N(6)-[3-(p-nitrophenyl)-norcamphanyl-2-adenosine, m.p. 100–105° C. (softening)
N(6)-[3-(o-aminophenyl)-norcamphenyl-2]-adenosine
N(6)-[3-(m-aminophenyl)-norcamphanyl-2]-adenosine
N(6)-[3-(p-aminophenyl)-norcamphanyl-2]-adenosine, amorphous; aminophenyl group was detected by mass spectrum
N(6)-[3-(o-(N-acetylamino)-phenyl)-norcamphany-2]-adenosine
N(6)-[3-(m-N-acetylamino)-phenyl)-norcamphanyl-2]-adenosine
N(6)-[3-(p-(N-acetylamino)-phenyl-norcamphanyl-2]-adenosine
N(6)-[3(3,4-methylenedioxyphenyl)-norcamphanyl-2]-adenosine, amorphous, softening point at about 118° C; $[\alpha]_D^{20}$—46.0° chloroform), —53.9° (methanol)
N(6)-[3-(2,3-methylenedioxyphenyl)-noncamphanyl-2]-adenosine
N(6)-(3-methyl-norcamphanyl-2)-adenosine
N(6)-(3-ethyl-norcamphanyl-2)adenosine
N(6)-(3-isopropyl-norcamphanyl-2)-adenosine
N(6)-(3-cyclophentyl-norcamphanyl-2)-adenosine
N(6)-(3-cyclohexyl-norcamphanyl-2)-adenosine
N(6)-(3-hydroxymethyl-norcamphanyl-2)-adenosine
N(6)-(3-methoxycarbonyl-norcamphanyl-2)-adenosine
N(6)-(3-ethoxycarbonyl-norcamphanyl-2)-adenosine
N(6)-(3-isobutoxycarbonyl-norcamphanyl-2)-adenosine
N(6)-(3-phenyl-norcamphanyl-2-methyl)-adenosine, amorphous, softening point at about 182–185° C.
N(6)-[3-(thienyl-2)-norcamphanyl-2-methyl]-adenosine
N(6)-[3-(thienyl-3)-norcamphanyl-2-methyl]-adenosine
N(6)-[3-(furyl-2)-norcamphanyl-2-methyl]-adenosine
N(6)-[3-(tetrahydrofuryl-2)-norcamphanyl-2-methyl]-adenosine
N(6)-[3-(furyl-3)-norcamphanyl-2-methyl]-adenosine
N(6)-[3-(3,4-methylenedioxyphenyl)-norcamphanyl-2-methyl]-adenosine
N(6)-(3-methyl-norcamphanyl-2-methyl)adenosine
N(6)-(3-hydroxymethyl-norcamphanyl-2-methyl)-adenosine
N(6)-(3-methoxycarbonyl-norcamphanyl-2-methyl)-adenosine
N(6)-[2-(3-phenyl-norcamphanyl-2)-ethyl]-adenosine
N(6)-[2-(3-(thienyl-2)-norcamphanyl-2)-ethyl]-adenosine
N(6)-[2-(3-(thienyl-3)-norcamphanyl-2)-ethyl]-adenosine
N(6)-[2-(3-(furyl-2)-norcamphanyl-2)-ethyl]-adenosine
N(6)-[2,3-(3,4-methylenedioxyphenyl)norcamphanyl-2)-ethyl]-adenosine
N(6)-(3-phenyl-bicyclo[2,2,2]octyl-2)-adenosine, m. p. 125–140° C. (softening); $R_F$-value 0.35 (eluent chloroform:methanol=9:1); $[\alpha]_D^{20}$ —51.6° (ethanol), —37.1° (chloroform)
N(6)-[3-furyl-2)-bicyclo[2,2,2]octyl-2]-adenosine
N(6)-[3-(tetrahydrofuryl-2)-bicyclo[2,2,2]octyl-2]-adenosine
N(6)-[3-(furyl-3)-bicyclo[2,2,2]octyl-2]-adenosine
N(6)-[3-(tetrahydrofuryl-3)-bicyclo[2,2,2]octyl-2]-adenosine
N(6)-[3-(thienyl-2)-bicyclo[2,2,2]octyl-2]-adenosine, m.p. 112–128° C. (softening); $[\alpha]_D^{20}$ —45.2° (methanol)
N(6)-[3-(thienyl-3)bicyclo[2,2,2]octyl-2]-adenosine
N(6)-[3-(pyridyl-2)-bicyclo[2,2,2]octyl-2]-adenosine
N(6)-[3-pyridyl-3)-bicyclo[2,2,2]octyl-2]-adenosine
N(6)-[3-(pyridyl-4)-bicyclo[2,2,2]octyl-2]-adenosine
N(6)-[3-(piperidyl-2)-bicyclo[2,2,2]octyl-2]-adenosine
N(6)-[3-(piperidyl-3)-bicyclo[2,2,2]octyl-2]-adenosine
N(6)-[3-(piperidyl-4)-bicyclo[2,2,2]octyl-2]-adenosine N(6)-[3-(o-tolyl)-bicyclo[2,2,2]octyl-2]-adenosine, m.p. 108–118° C. (softening); $[\alpha]_D^{20}$ —47.1° (methanol)
N(6)-[3-(m-tolyl)-bicyclo[2,2,2]octyl-2]-adenosine
N(6)-[3-(p-tolyl)-bicyclo[2,2,2]octyl-2]-adenosine, m.p. 136–139° C.
N(6)-[3-(2,3-dimethylphenyl)-bicyclo[2,2,2]octyl-2]-adenosine
N(6)-[3-(2,4-dimethylphenyl)-bicyclo[2,2,2]octyl-2]-adenosine
N(6)-[3-(2,4,6-trimethylphenyl)-bicyclo[2,2,2]octyl-2]-adenosine
N(6)-[3-(3,4,5-trimethylphenyl-bicyclo[2,2,2]-2]-adenosine
N(6)-[3-(o-fluorophenyl)-bicyclo[2,2,2]octyl-2]-adenosine
N(6)-[3-(p-chlorophenyl)-bicyclo[2,2,2]octyl-2]-adenosine
N(6)-[3-(2,4-dichlorophenyl)-bicyclo[2,2,2]octyl-2]-adenosine
N(6)-[3-(2,4,6-trichlorophenyl)bicyclo[2,2,2]octyl-2]-adenosine
N(6)-[3-(p-methoxyphenyl)-bicyclo[2,2,2]octyl-2]-adenosine
N(6)-[3-(3,4-dimethoxyphenyl)-bicyclo[2,2,2]octyl-2]-adenosine
N(6)-[3-(2,3,4-trimethoxyphenyl)-bicyclo[2,2,2]octyl-2]-adenosine
N(6)-[3-(3,4,5-trimethoxyphenyl)-bicyclo[2,2,2]octyl-2]-adenosine, m.p. 120–135° C. (softening point); $[\alpha]_D^{20}$ —42.3° (methanol)
N(6)-[3-p-hydroxyphenyl)-bicyclo[2,2,2]octyl-2]-adenosine
N(6)-[3-(3,4-dihydroxyphenyl)-bicyclo[2,2,2]octyl-2]-adenosine
N(6)-[3-(2,4,6-trihydroxyphenyl)-bicyclo[2,2,2]octyl-2]-adenosine
N(6)-[3-(p-nitrophenyl)-bicyclo[2,2,2]octyl-2]-adenosine
N(6)-[3-(p-aminophenyl)bicyclo[2,2,2]octyl-2]-adenosine
N(6)-[-(p-(N-acetylamino)phenyl)-bicyclo[2,2,2]octyl-2]-adenosine
N(6)-[3-(2,3-methylenedioxyphenyl)bicyclo[2,2,2]octyl-2]-adenosine
N(6)-[3-(3,4-methylenedioxyphenyl)-bicyclo[2,2,2]octyl-2]-adenosine, $[\alpha]_D^{20}$ —44.5° (methanol)
N(6)-[3-phenyl-bicyclo[2,2,2]octyl-2-methyl]-adenosine
N(6)-[3-(3,4-methylenedioxyphenyl)bicyclo[2,2,2]octyl-2-methyl]-adenosine
N(6)-(3-methyl-bicyclo[2,2,2]octyl-2-methyl)-adenosine
N(6)-3-ethyl-bicyclo[2,2,2]octyl-2-methyl)-adenosine
N(6)-(3-isopropyl-bicyclo[2,2,2]octyl-2-methyl)-adenosine
N(6)-(3-cyclopentyl-bicyclo[2,2,2]octyl-2-methyl)-adenosine
N(6)-(3-cyclohexyl-bicyclo[2,2,2]octyl-2-methyl)-adenosine
N(6)-(3-hydroxymethyl-bicyclo[2,2,2]octyl-2-methyl)-adenosine
N(6)-(3-methoxycarbonyl-bicyclo[2,2,2]octyl-2-methyl)-adenosine
N(6)-(3-ethoxycarbonyl-bicyclo[2,2,2]octyl-2-methyl)-adenosine
N(6)-(3-isobutoxycarbonyl-bicyclo[2,2,2]octyl-2-methyl)-adenosine
N(6)-(3-phenyl-norcamphanyl-2)-2-fluoroadenosine
N(6)-(3-phenyl-norcamphanyl-2)-2-chloroadenosine, m.p. about 125–130° C.; $[\alpha]_D^{20}$ —38.5° (chloroform), —41.0° (methanol)
N(6)-[3-(3,4-dimethoxyphenyl)norcamphanyl-2]-2-chloroadenosine, m.p. 88° C.; $R_F$-value 0.3 (eluent chloroform:methanol=9:1)
N(6)-[3-(furyl-2)-norcamphanyl-2]-norcamphanyl-2]-2-chloroadenosine
N(6)-[3-(thienyl-2)norcamphanyl-2]-2-chloroadenosine
N(6)-[3-(3,4-methylenedioxyphenyl)norcamphanyl-2]-2-chloroadenosine
N(6)-(3-methyl-norcamphanyl-2)-2-chloroadenosine
N(6)-(3-cyclopentyl-norcamphanyl-2)-2-chloroadenosine
N(6)-(3-cyclohexyl-norcamphanyl-2)-2-chloroadenosine
N(6)-(3-phenyl-bicyclo[2,2,2]octyl-2)-2-fluoroadenosine
N(6)-(3-phenyl-bicyclo[2,2,2]octyl-2)-2-fluoroadenosine
N(6)-(3-phenyl-bicyclo[2,2,2]octyl-2)-2-chlorodenosine, m.p. about 140–155° C. (softening point); $[\alpha]_D^{20}$ —37.1° (methanol), —33.7° (chlorofrom)
N(6)-[3-(3,4-dimethoxyphenyl)-bicyclo[2,2,2]octyl-2]-chloroadenosine
N(6)-[3-(3,4-methylenedioxyphenyl)-bicyclo[2,2,2]octyl-2]-2-chloroadenosine
N(6)-[3-(thienyl-2)-bicyclo[2,2,2]octyl-2]-2-chloroadenosine
N(6)-[3-(furyl-2)-bicyclo[2,2,2]octyl-2]-2-chloroadenosine
N(6)-[3-tetrahydrofuryl-2)-bicyclo[2,2,2]octyl-2]-2-chloroadenosine
N(6)-[3-ethylbicyclo[2,2,2]octyl-2]-2-chloroadenosine
N(6)-[3-cyclohexyl-bicyclo[2,2,2]octyl-2]-2-chloroadenosine
N(6)-(3-phenyl-norcamphanyl-2)-2-aminoadenosine, m.p. about 145° C. (softening point); $[\alpha]_D^{20}$ —36.7° chloroform), —48.3° (methanol)
N(6)-[3-(furyl-2-)-norcamphanyl-2]-2-aminoadenosine
N(6)-[3-(tetrahydrofuryl-2)-norcamphanyl-2]-2-aminoadenosine
N(6)-[3-(thienyl-2)-norcamphanyl-2]-2-aminoadenosine, m.p. 80–90° C. (softening point); $[\alpha]_D^{20}$ —39.2° (methanol)
N(6)-[3-(thienyl-3)-norcamphanyl-2]-2-aminoadenosine
N(6)-[3-(pyridyl-2)-norcamphanyl-2]-2-aminoadenosine
N(6)-[3-(pyridyl-3)-norcamphanyl-2]-2-aminoadenosine
N(6)-[3-(pyridyl-4)-norcamphanyl-2]-2-aminodenosine
N(6)-[3-(piperidyl-2)-norcamphanyl-2]-2-aminoadenosine
N(6)-[3-(piperidyl-3)-norcamphanyl-2]-2-aminoadenosine
N(6)-[3-(piperidyl-4)-norcamphanyl-2]-2-aminoadenosine
N(6)-[3-(o-tolyl)-norcamphanyl-2]-2-aminoadenosine
N(6)-[3-(m-tolyl)-norcamphanyl-2]-2-aminoadenosine
N(6)-[3-(p-tolyl)-norcamphanyl-2]-2-aminoadenosine
N(6)-[3-(p-methoxyphenyl)-norcamphanyl-2]-2-aminoadenosine
N(6)-[3-(3,4-dimethoxyphenyl)-norcamphanyl-2]-2-aminoadenosine, m.p. 125–145° C. (softening point); $[\alpha]_D^{20}$ —43.2° (chloroform)
N(6)-[3-(3,4,5-trimethoxyphenyl)-norcamphanyl-2]-2-aminoadenosine, m.p. 85–103° C. (softening point); $[\alpha]_D^{20}$ —33.5° (methanol), —34.6° (chloroform)
N(6)-[3-(p-hydroxyphenyl)-norcamphanyl-2]-2-aminoadenosine
N(6)-[3-(3,4-dihydroxyphenyl)-norcamphanyl-2]-2-aminoadenosine, m.p. 138–152° C. (softening point); $[\alpha]_D^{20}$—47.0° (methanol)
N(6)-[3-(p-aminophenyl)-norcamphanyl-2]-2-aminoadenosine
N(6)-[3-(p-(N-acetylamino)-phenyl)-norcamphanyl-2]-aminoadenosine
N(6)-[3-(3,4-methylenedioxyphenyl)-norcamphanyl-2]-2-aminoadenosine, amorphous; $[\alpha]_D^{20}$ —35.8° (chloroform), —39.1° (methanol)
N(6)-(3-methyl-norcamphanyl-2)-2-aminoadenosine
N(6)-(3-ethyl-norcamphanyl-2)-2-aminoadenosine N(6)-(3-isopropyl-norcamphanyl-2)-2-aminoadenosine
N(6)-(3-cyclopentyl-norcamphanyl-2)-2-aminoadenosine
N(6)-(3-cyclohexyl-norcamphanyl-2)-2-aminoadenosine
N(6)-(3-hydroxymethyl-norcamphanyl-2)-2-aminoadenosine
N(6)-(3-methoxycarbonyl-norcamphanyl-2)-2-aminoadenosine
N(6)-(3-ethoxycarbonyl-norcamphanyl-2)-2-aminoadenosine
N(6)-(3-isobutoxycarbonyl-norcamphanyl-2)-2-aminoadenosine
N(6)-(3-phenyl-bicyclo[2,2,2]octyl-2)-2-aminoadenosine, m.p. 110–130° C. (softening point); [α]$_D^{20}$ —45.2° (methanol)
N(6)-[3-(thienyl-2)-bicyclo[2,2,2]octyl-2]-2-aminoadenosine
N(6)-[3-(thienyl-3)-bicyclo[2,2,2]octyl-2]-2-aminoadenosine
N(6)-[3-(furyl-2)-bicyclo[2,2,2]octyl-2]-2-aminoadenosine
N(6)-[3-(tetrahydrofuryl-2)-bicyclo[2,2,2]octyl-2-]-2-aminoadenosine
N(6)-[3-(3,4-methylenedioxyphenyl)-bicyclo[2,2,2]octyl-2]-2-aminoadenosine
N(6)-(3-methyl-bicyclo[2,2,2]octyl-2)-2-aminoadenosine
N(6)-(3-hydroxymethyl-bicyclo[2,2,2]octyl-2)-2-aminoadenosine
N(6)-(3-methoxycarbonyl-bicyclo[2,2,2]octyl-2)-2-aminoadenosine
N(6)-(3-cyclopentyl-bicyclo[2,2,2]octyl-2)-2-aminoadenosine
N(6)-(3-cyclohexyl-bicyclo[2,2,2]-octyl-2)-2-aminoadenosine
N(6)-(3-phenyl-norcamphanyl-2)-2-dimethylaminoadenosine
N(6)-[3-(furyl-2)-norcamphanyl-2]-2-dimethylaminoadenosine
N(6)-[3-tetrahydrofuryl-2)norcamphanyl-2]-2-dimethylaminoadenosine
N(6)-[3-(thienyl-2)-norcamphanyl-2]-2-dimethylaminoadenosine, m.p. 85–115° C. (softening point; [α]$_D^{20}$ —12° (methanol)
N(6)-[3-(thienyl-3)-norcamphanyl-2]-2-dimethylaminoadenosine
N(6)-[3-(pyridyl-2)-norcamphanyl-2]-2-dimethylaminoadenosine
N(6)-[3-(piperidyl-4)-norcamphanyl-2]-2-dimethylaminoadenosine
N(6)-[3-(o-tolyl)-norcamphanyl-2]-2-dimethylaminoadenosine
N(6)-[3-(ptolyl)norcamphanyl-2]-2-dimethylaminoadenosine
N(6)-[3-(p-toly)-norcamphanyl-2]-2-dimethylaminoadenosine
N(6)-[3-(p-methoxyphenyl)-norcamphanyl-2]-2-dimethylaminoadenosine
N(6)-[3-(3,4-dimethoxyphenyl)-norcamphanyl-2]-2-dimethylaminoadenosine, m.p. 90–105° C. (softening point); [α]$_D^{20}$ —12.8° (methanol)
N(6)-[3-(3,4,5-trimethoxyphenyl)-norcamphanyl-2]-2-dimethylaminoadenosine
N(6)-[3-(p-hydroxyphenyl)-norcamphanyl-2]-2-dimethylaminoadenosine
N(6)-[3-(3,4-dihydroxyphenyl)-norcamphany-2]-2-dimethylaminoadenosine
N(6)-[3-(p-aminophenyl)-norcamphanyl-2]-2-dimethylaminoadenosine
N(6)-[3-(p-(N-acetylamino)-phenyl)-norcamphanyl-2]-2-dimethylaminoadenosine
N(6)-[3-(3,4-methylenedioxyphenyl)-norcamphanyl-2]-2-dimethylaminoadenosine
N(6)-(3-methyl-norcamphanyl-2)-2-dimethylaminoadenosine
N(6)-(3-ethyl-norcamphanyl-2)-2-dimethylaminoadenosine
N(6)-(3-isopropyl-norcamphanyl-2)-2-dimethaminoadenosine
N(6)-(3-cyclopentyl-norcamphanyl-2)-2-dimethylaminoadenosine
N(6)-(3-cyclohexyl-norcamphanyl-2)-2-dimethylaminoadenosine
N(6)-(3-hydroxymethyl-norcamphanyl-2)-2-dimethylaminoadenosine
N(6)-(3-methoxycarbonyl-norcamphanyl-2)-2-dimethylaminoadenosine
N(6)-(3-ethoxycarbonyl-norcamphanyl-2)-2-dimethylaminoadenosine
N(6)-(3-isobutoxycarbonyl-norcamphanyl-2)-2-dimethylaminoadenosine
N(6)-(3-phenyl-bicyclo[2,2,2]octyl-2)-2-dimethylaminoadenosine
N(6)-[3-(thienyl-2)-bicyclo[2,2,2]octyl-2]-2-dimethylaminoadenosine
N(6)-[3-(thienyl-3)-bicyclo[2,2,2]octyl-2]-2-dimethylaminoadenosine
N(6)-[3-(furyl-2)-bicyclo[2,2,2]octyl-2]-2-dimethylaminoadenosine
N(6)-[3-(tetrahydrofuryl-2)-bicyclo[2,2,2]octyl-2]-2-dimethylaminoadenosine
N(6)-[3-(3,4-methylenedioxyphenyl)-bicyclo[2,2,2]octyl-2]-2-dimethylaminoadenosine
N(6)-(3-methyl-bicyclo[2,2,2]octyl-2)-2-dimethylaminoadenosine
N(6)-(3-hydroxymethyl-bicyclo[2,2,2]octyl-2)-2-dimethylaminoadenosine
N(6)-(3-methoxycarbonyl-bicyclo[2,2,2]octyl-2)-2-dimethylaminoadenosine
N(6)-(3-cyclopentyl-bicyclo[2,2,2]octyl-2)-dimethylaminoadenosine
N(6)-(3-cyclohexyl-bicyclo[2,2,2]octyl-2)-2-dimethylaminodenosine
N(6)-(3-phenyl-norcamphanyl-2)-2-methylthioadenosine
N(6)-[3-(thienyl-2)-norcamphanyl-2]-2-methylthioadenosine
N(6)-[3-(furyl-2)-norcamphanyl-2]-2-methylthioadenosine
N(6)-[3-(3,4-methylenedioxyphenyl)-norcamphanyl-2]-2-methylthioadenosine
N(6)-(3-phenyl-norcamphanyl-2)-ethylthiodenosine
N(6)-(3-phenyl-norcamphanyl-2)-2-methoxyadenosine
N(6)-[3-(thienyl-2)-norcamphanyl-2]-2-methoxyadenosine
N(6)-[3-(furyl-2)-norcamphanyl-2]-2-methoxyadenosine
N(6)-[3-(3,4-methylenedioxyphenyl)-norcamphanyl-2]-2-methoxyadenosine
N(6)-(3-phenyl-norcamphanyl-2)-2-ethoxyadenosine
N(6)-(3-phenyl-bicyclo[2,2,2]octyl-2)-2-methylthioadenosine
N(6)-[3-(thienyl-2)-bicyclo[2,2,2]octyl-2]-2-methylthioadenosine
N(6)-[3-(furyl-2)-bicyclo[2,2,2]octyl-2]-2-methylthioadenosine
N(6)-[3-(3,4-methylenedioxyphenyl)-bicyclo[2,2,2]octyl-2]-2-methylthioadenosine
N(6)-(3-phenyl-bicyclo[2,2,2]octyl-2)-ethylthioadenosine
N(6)-(3-phenyl-bicyclo[2,2,2]octyl-2)-methoxyadenosine
N(6)-[3-(thienyl-2)-bicyclo[2,2,2]octyl-2]-2-methoxyadenosine
N(6)-[3-(furyl-2)-bicyclo[2,2,2]octyl-2]-2-methoxyadenosine
N(6)-[3-(3,4-methylenedioxyphenyl)-bicyclo[2,2,2]octyl-2]-2-methoxyadenosine
N(6)-(3-phenyl-bicyclo[2,2,2]octyl-2)-2-ethoxyadenosine
N(6)-(7-methyl-bicyclo[3,2,2]nonyl-6)-adenosine
N(6)-(7-hydroxymethyl-bicyclo[3,2,2]nonyl-6)-adenosine N(6)-(7-methoxycarbonyl-bicyclo[3,2,2]nonyl-6)-adenosine
N(6)-(7-cyclopentyl-bicyclo[3,2,2]nonyl-6)-adenosine
N(6)-(7-cyclohexyl-bicyclo[3,2,2]nonyl-6)-adenosine
N(6)-(7-phenyl-bicyclo]3,2,2]nonyl-6)-adenosine, m.p. 178–180° C.
N(6)-[7-(thienyl-2)-bicyclo[3,2,2]nonyl-6]-adenosine
N(6)-[7-(thienyl-3-bicyclo[3,2,2]nonyl-6]-adenosine
N(6)-[7-(furyl-2)-bicyclo[3,2,2]nonyl-6]-adenosine
N(6)-[7-(tetrahydrofuryl-2)bicyclo[3,2,2]nonyl-6]-adenosine
N(6)-[7-(3,4-methylenedioxyphenyl)-bicyclo[3,2,2] nonyl-6]adenosine, m.p. 140–146° C. (softening point)
N(6)-(7-phenyl-bicyclo[3,2,2]nonyl-6)-aminoadenosine
N(6)-[7-(3,4-methylenedioxyphenyl)-bicyclo[3,2,2] nonyl-6]-2-dimethylaminoadenosine
N(6)-(7-cyclopentyl-bicyclo[3,2,2]nonyl-6)-2-dimethylaminoadenosine

EXAMPLE 2

2.5 g. of 6-methylmercapto-9-($\beta$-D-ribofuranosyl)-purine and 3.8 g. of 3-phenyl-norcamphanyl-2-amine are heated for 10 hours in the melt to 130–140° C. The residue, after cooling, is taken up in chloroform and worked up as described in Example 1, thus obtaining N(6) - (3 - phenyl-norcamphanyl-2)-adenosine, m.p. between about 85 and 100° C.

Analogously, with the amines indicated in Example 1, the adenosine derivatives listed in the foregoing example are produced.

EXAMPLE 3

2.5 g. of 6-chloro-9-($\beta$-D-ribofuranosyl)-purine and 3.6 g. of 3-phenyl-norcamphanyl-2-amine are heated to 120° C. for 5 hours. The solid melt is taken up in dioxane, filtered, concentrated, and then taken up in chloroform. The mixture is worked up as set forth in Example 1, thus obtaining N(6)-(3-phenylnorcamphanyl-2)-adenosine, m.p. between about 85 and 100° C.

Analogously, the adenosine derivatives set forth in Example 1 are produced with the amines indicated in Example 1.

EXAMPLE 4

2.9 g. of 6-chloro-9-($\beta$-D-ribofuranosyl)-purine and 2.2 g. of 3-phenyl-norcamphanyl-2-methylamine are refluxed in 200 ml. of isopropanol with 5 ml. of triethylamine for 10 hours. The solvent is evaporated and the residue treated with chloroform and water. The chloroform solution is dried and concentrated by evaporation, thus producing N(6)-(3-phenyl-norcamphanyl-2-methyl)adenosine, m.p. about 182–185° C. (from isopropanol/ether).

EXAMPLE 5

2.5 g. of 2-amino - 6 - chloro-9-($\beta$-D-ribofuranosyl)-purine and 1.9 g. of 3-phenyl-norcamphanyl-2-amine are refluxed in 100 ml. of isopropanol with 5 ml. of triethylamine for 24 hours. The solvent is evaporated and the residue triturated with water, during which step the reaction mixture becomes solid, but does not crystallize. In this way, N(6)-(3-phenyl-norcamphanyl-2) - 2 - aminoadenosine is obtained, m.p. about 145° C.; $[\alpha]_D^{20}$ —36.7° (chloroform), —48.3° (methanol).

EXAMPLE 6

6.9 g. of 2-chloro-6-(3-phenyl-norcamphanyl-2)-9-(2',3',5'-tri-O-acetyl - $\beta$ - D-ribofuranosyl)-purine (produced from 2,6 - dichloro-9-(2',3',5'-tri-O-acetyl-$\beta$-D-ribofuranosyl)-purine and 3-phenyl-norcamphanyl-2-amine in isopropanol with the addition of triethylamine) is treated in 200 ml. of ammonia-saturated ethanol at room temperature for 4 days. Then, the solvent is removed and the residue triturated with water, thus obtaining amorphous N(6)-(3-phenyl-norcamphanyl - 2) - 2 - chloroadenosine, m.p. about 125–130° C.; $[\alpha]_D^{20}$ —38.5° (chloroform), —41.0° (methanol).

Analogously, from the corresponding 2',3',5'-tri-O-acetyl derivatives, the compounds in Example 1 are likewise produced.

EXAMPLE 7

72.0 g. of N(6)-(3-phenyl-norcamphanyl-2)-2',3',5'-tri-O-acetyladenosine (prepared from 1-(tri-O-acetyl-$\beta$-D-ribofuranosyl)-6-chloropurine and 3-phenyl-norcamphanyl-2-amine in isopropanol) is refluxed with a solution of 1.0 g. of sodium in 1 l. of methanol for 90 minutes. Then, the mixture is neutralized with acetic acid, evaporated, and the residue chromatographed on a silica gel column (700 g. of silica gel; elution with chloroform:methanol =99:1), thus producing N(6)-(3-phenyl-norcamphanyl-2)-adenosine, m.p. between about 85 and 100° C.

EXAMPLE 8

(a) 1.0 g. of N(6)-(3-phenyl-norcamphanyl-2)adenine is refluxed with 10 ml. of hexamethyldisilazane for 15 hours. Then, the reaction mixture is concentrated by evaporation and the residue allowed to stand at room temperature with 1.6 g. of 2,3,5-tri-O-benzyl-D-ribofuranosyl chloride in 50 ml. of acetonitrile for 3 days. Thereafter, the mixture is refluxed for 2 hours. The solvent is evaporated and the residue distributed between water and chloroform. The chloroform layer is dried and evaporated, thus obtaining 2',3',5'-tri-O-benzyl-N(6)-(3 - phenyl-norcamphanyl-2)-adenosine as an amorphous syrup.

(b) The crude product obtained in accordance with (a) is taken up in 50 ml. of ethanol and hydrogenated on 0.5 g. of palladium charcoal at room temperature under agitation. The catalyst is filtered off, the mixture is evaporated, and the residue is triturated with water, thus producing N(6)-(3-phenylnorcamphanyl-2)-adenosine as an amorphous substance, m.p. about 85–100° C.

EXAMPLE 9

(a) 1.0 g. of 2,6-bis-benzylthio-9-($\beta$-D-ribofuranosyl)-purine and 0.5 g. of 2-amino-3-phenyl-norcamphane are heated for 12 hours to 130° C. and the melt is dissolved in chloroform. The reaction mixture is washed with sodium carbonate solution, dried over sodium sulfate, and evaporated, thus obtaining crude N(6)-(3-phenyl-norcamphanyl-2)-2-benzylthioadenosine.

(b) The crude product obtained according to (a) is refluxed, in 50 ml. of ethanol, with 6 g. of Raney nickel for 12 hours. The catalyst is filtered off and the solution is then concentrated by evaporation, thus obtaining N(6)-(3-phenylnorcamphanyl-2)-adenosine, m.p. between about 85 and 100° C.

EXAMPLE 10

1.0 g. of N(6) - (3-phenyl-norcamphanyl-2)-2-chloroadenosine in 100 ml. of ethanol is hydrogenated with 0.8 g. of 10% palladium charcoal with the addition of 0.5 g. of sodium acetate in an agitator for 16 hours. The catalyst is filtered off and the solution is concentrated. The residue is distributed between chloroform and water, and the chloroform solution is evaporated after drying, thus obtaining amorphous N(6) - (3-phenyl-norcamphanyl-2)-adenosine, m.p. between about 85 and 100° C.

EXAMPLE 11

In a compact fermentor, 10 l. of a sterile nutrient solution of 1.0% glucose, 0.5% peptone, 0.2% yeast extract, 0.1% ammonium phosphate, monobasic, 0.05% magnesium sulfate, and 0.001% iron (II) sulfate (pH 6.8) is inoculated with a submerse culture of Bacillus subtilis. The culture grows at 28° C. under aeration and agitation and, after 20 hours, 1 g. of N(6)-(3-phenyl-norcamphanyl-2)-adenine is added thereto. After 48 hours, the reaction is terminated (controlled by thin-layer chromatography). Then, the reaction mixture is extracted with chloroform, washed with water, dried over sodium sulfate, mixed with animal charcoal and thoroughly shaken, filtered, and concentrated by evaporation. With ether, amorphous N(6)-(3-phenyl-norcamphanyl-2)-adenosine is obtained, m.p. 85–100° C.

Analogously, the adenosine compounds set forth in Example 1 are produced from the corresponding adenine derivatives and glucose by the microbiological method.

EXAMPLE 12

2 g. of N(6) - (3-phenyl-norcamphanyl-2)-adenine in 100 ml. of dimethylformamide is mixed with 0.6 ml. of concentrated hydrochloric acid and 3 g. of the phenyl ester of polyphosphoric acid. The mixture is heated for 10 minutes to 50° C., and 0.2 g. of ribose in 50 ml. of dimethylformamide is added thereto. The solvent is removed, the residue is heated for 3 minutes to 100° C. and dissolved in 5 ml. of a water-methanol mixture (1:1). The mixture is neutralized with 2N NaOH, cooled, filtered, and concentrated by evaporation, thus obtaining N(6)-(3-phenyl-norcamphanyl-2)-adenosine, amorphous, m.p. 85–100° C. (from ether).

EXAMPLE 13

2.67 g. of adenosine in 70 ml. of dimethylformamide is heated with 2.2 g. of 2 - chloromethyl-3-phenyl-norcamphane for 24 hours to 80° C. The solvent is then evaporated under vacuum and the residue taken up in water. Then, the mixture is heated with 20 ml. of concentrated ammonia for 2 hours to 80–90° C., evaporated, and treated with chloroform and water. The chloroform solution is dried and evaporated, thus producing N(6)-(3-phenyl-norcamphanyl-2-methyl)-adenosine, m.p. about 182–185° C. (from isopropanol/ether).

Analogously, the following compound is obtained from 2 - chloroadenosine and 2 - chloromethyl-3-phenyl-norcamphane: N(6) - (3-phenyl-norcamphanyl-2-methyl)-2-chloroadenosine, amorphous.

EXAMPLE 14

1.0 g. of N(6) - (3-phenyl-norcamphanyl-2)-2-chloroadenosine [producible from 2,6-dichloro-9-(β-D-ribofuranosyl)-purine and 3 - phenyl-norcamphanyl-2-amine] in 50 ml. of dioxane and 50 ml. of hydrazine hydrate is refluxed for 12 hours. The reaction mixture is concentrated by evaporation, distributed in chloroform/water, and the chloroform extract is dried and evaporated. Upon the addition of ether, N(6)-(3-phenyl-norcamphanyl-2)-2-hydrazinoadenosine, m.p. 179–182° C., is produced.

Analogously, the following compounds are obtained from the corresponding 2-chloroadenosine derivatives and hydrazine hydrate:

N(6)-[3-(thienyl-2)-norcamphanyl-2]-2-hydrazinoadenosine
N(6)-[3-(furyl-2)-norcamphanyl-2]-2-hydrazinoadenosine
N(6-)-[3-(tetrahydrofuryl-2)-norcamphanyl-2]-2-hydrazinoadenosine
N(6)-[3-(3,4-methylenedioxyphenyl)-norcamphanyl-2]-hydrazinoadenosine
N(6)-[3-(3,4-dimethoxyphenyl)-norcamphanyl-2]-2-hydrazinoadenosine
N(6)-[3-(methyl)-norcamphanyl-2]-2-hydrazinoadenosine
N(6)-[3-(methoxycarbonyl-norcamphanyl-2]-2-hydrazinoadenosine
N(6)-[3-(hydroxymethyl)-norcamphanyl-2[-2-hydrazinoadenosine
N(6)-[3-(cyclopentyl)-norcamphanyl-2]-2-hydrazinoadenosine
N(6) (3-phenyl-bicyclo[2,2,2]octyl-2)-2-hydrazinoadenosine
N(6)-[3-(thienyl-2)-bicyclo[2,2,2]octyl-2]-2-hydrazinoadenosine
N(6)-[3-(furyl-2)-bicyclo[2,2,2]octyl-2]-2-hydrazinoadenosine
N(6)-[3-(tetrahydrofuryl-2)-bicyclo[2,2,2]octyl-2]-2-hydrazinoadenosine
N(6)-[3-(3,4-methylenedioxyphenyl)-bicyclo[2,2,2]octyl-2]-2-hydrazinoadenosine
N(6)-[3-(3,4-dimethoxyphenyl)-bicyclo[2,2,2]octyl-2]-2-hydrazinoadenosine
N(6)-[3-(methyl)-bicyclo[2,2,2]octyl-2]-2-hydrazinoadenosine
N(6)-[3-(methoxycarbonyl-bicyclo[2,2,2]octyl-2]-2-hydrazinoadenosine
N(6)-[3-(hydroxymethyl)-bicyclo[2,2,2]octyl-2]-2-hydrazinoadenosine
N(6)-[3-(cyclopentyl)-bicyclo[2,2,2-]octyl-2]-2-hydrazinoadenosine

EXAMPLE 15

1.0 g. of N(6)-(3-phenyl-norcamphanyl-2)-2-hydrazinoadenosine (obtainable in accordance with Example 14) in 50 ml. of methanol is refluxed with about 8 g. of Raney nickel for 8 hours. After filtering off the catalyst, the solvent is removed, and the residue is triturated with water, thus obtaining N(6)-(3-phenyl-norcamphanyl-2)-2-aminoadenosine, m.p. about 145° C.; $[\alpha]_D^{20}$ —36.7° (chloroform), —48.3° (methanol).

Analogously, the corresponding 2-amino compounds are produced from the remaining 2-hydrazino compounds set forth in Example 14.

EXAMPLE 16

8.4 g. of 6 - chloro-9-(2',3',5'-tri-O-acetyl-β-D-ribofuranosyl)-purine and 7.2 g. of (3 - phenyl-bicyclo[2,2,1] hept-5-ene-2)amine are refluxed in 150 ml. of isopropanol with 10 ml. of triethylamine for 15 hours. The mixture is evaporated, taken up in chloroform, extracted with dilute acetic acid, dried, and again evaporated. The residue is refluxed with a solution of 1 g. of sodium in 100 ml. of methanol for 90 minutes. The mixture is concentrated by evaporation and chromatographed with 150 g. of silica gel (eluent chloroform), thus obtaining N(6)-(3-phenyl-bicyclo[2,2,1]hepten - 5 - yl - 2)-adenosine, amorphous; $[\alpha]_D^{20}$ —51.6° (chloroform), —56.3° (methanol).

Analogously, the following unsaturated adenosine derivatives are produced with the corresponding amines:

N(6)-[3-(thienyl-2)-bicyclo[2,2,1]hepten-5-yl-2]-adenosine
N(6)-[3-(furyl-2)-bicyclo[2,2,1]hepten-5-yl-2]-adenosine
N(6)-[3-(tetrahydrofuryl-2)-bicyclo[2,2,1]hepten-5-yl-2]-adenosine
N(6)-[3-(3,4-methylenedioxyphenyl)-bicyclo[2,2,1[ hepten-5-yl-2]-adenosine
N(6)-[3-(3,4-dimethoxyphenyl)-bicyclo[2,2,1]hepten-5-yl-2]-adenosine
N(6)-(3-phenyl-bicyclo[2,2,1]hepten-5-yl-2)-2-chloroadenosine
N(6)-(3-phenyl-bicyclo[2,2,1]hepten-5-yl-2)-2-aminoadenosine
N(6)-[3-(thienyl-2)-bicyclo[2,2,1]hepten-5-yl-2]-2-dimethylamino-adenosine
N(6)-(3-methyl-bicyclo[2,2,1]hepten-5-yl-2)-adenosine
N(6)-(3-methoxycarbonyl-bicyclo[2,2,1]hepten-5-yl-2)-adenosine
N(6)-(3-hydroxymethyl-bicyclo[2,2,1]hepten-5-yl-2)-adenosine
N(6)-(3-cyclopentyl-bicyclo[2,2,1]hepten-5-yl-2)-adenosine
N(6)-(3-cyclohexyl-bicyclo[2,2,1]hepten-5-yl-2-adenosine
N(6)-(3-methyl-bicyclo[2,2,1]hepten-5-yl-2)-2-aminoadenosine
N(6)-(3-phenyl-bicyclo[2,2,2]octen-5-yl-2)-adenosine
N(6)-[3-(thienyl-2)-bicyclo[2,2,2]octen-5-yl-2]-adenosine
N(6)-[3-(furyl-2)-bicyclo[2,2,2]octen-5-yl-2]-adenosine N(6)-[3-(3,4-methylenedioxyphenyl)-bicyclo[2,2,2]octen-5-yl-2]-adenosine
N(6)-[3-(3,4-dimethoxyphenyl)-bicyclo[2,2,2]octen-5-yl-2]-adenosine
N(6)-(3-phenylbicyclo[2,2,2]octen-5-yl-2)-2-chloroadenosine
N(6)-(3-phenyl-bicyclo[2,2,2]octen-5-yl-2)-2-aminoadenosine
N(6)-[3-(thienyl-2)-bicyclo[2,2,2]octen-5-yl-2)-2-dimethylamino-adenosine
N(6)-(3-methyl-bicyclo[2,2,2]octen-5-yl-2)-adenosine
N(6)-(3-methoxycarbonyl-bicyclo[2,2,2]octen-5-yl-2)-adenosine
N(6)-(3-hydroxymethyl-bicyclo[2,2,2]octen-5-yl-2)-adenosine
N(6)-(3-cyclopentyl-bicyclo[2,2,2]octen-5-yl-2)-adenosine
N(6)-(3-cyclohexyl-bicyclo[2,2,2]octen-5-yl-2)-adenosine
N(6)-(3-methyl-bicyclo[2,2,2]octen-5-yl-2)-2-dimethylaminoadenosine

EXAMPLE 17

1.5 g. of 2-amino-3-phenyl-bicyclo[2,2,2]octane is added to a suspension of 1.95 g. of 6-chloro-9-(β-D-ribofuranosyl)-purine in 60 ml. of isopropanol, and the mixture is refluxed for 12 hours. Then, the mixture is concentrated under vacuum, the residue taken up in chloroform, and extracted with 1% acetic acid and thereafter with water. The organic phase is distilled off after drying, and the residue is dissolved in a small amount of acetone. After mixing with cyclohexane until the mixture is cloudy, N(6)-(3-phenyl-bicyclo[2,2,2]octyl-2) - adenosine is obtained, m.p. 125–140° C. )softening); $R_F$-value 0.35 (eluent chloroform:methanol=9:1); $[\alpha]_D^{20}$ —51.6° (ethanol), —37.1° (chloroform).

EXAMPLE 18

Analogously to Example 1, a (—)-N(6)-(3-phenylnorcamphanyl-2)-adenosine, $[\alpha]_D^{20}$ —104.5° (chloroform) and —138.7° (methanol), respectively, is obtained from (+)-3-phenylnorcamphanyl-2-amine $[\alpha]_D^{20}$ +36.8°, in methanol; obtainable by splitting the racemic base with N-benzenesulfonylglutamic acid and 6-chloro-9-(β-D-ribofuranosyl)-purine.

Analogously, a (+)-N(6)-(3-phenyl-norcamphanyl-2)-adenosine, $[\alpha]_D^{20}$ +46.6° (chloroform) and +53.6° (methanol), respectively, is produced with (—)-3-phenyl-norcamphanyl-2-amine ($[\alpha]_D^{20}$ —36.8° in methanol).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.
What is claimed is:
1. Adenosine derivatives of the formula

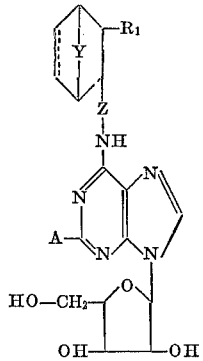

wherein A is H, halogen, $SR_2$, $OR_2$, $N(R_2)_2$, $NH-N(R_2)_2$ or $N_3$; $R_1$ is $CH_2OH$, alkyl of up to 6 carbon atoms, or cycloalkyl of 4–6 carbon atoms, $COOR_2$, furyl, tetrahydrofuryl, thienyl, a 5- or 6-membered saturated or unsaturated ring containing one or two nitrogen atoms and selected from the group consisting of pyrrolyl-2, pyrrolyl-3, pyrrolinyl-2, pyrrolinyl-3, pyrrolidinyl-2 pyrrolidinyl-3, pyrazolyl-2, pyrazolyl-3, imidazolyl-2, imidazolyl-3, pyridyl-2, pyridyl-3, pyridyl-4, piperidyl-2, piperidyl-3, piperidyl-4, pyridazyl-3, pyridazyl-4, pyridazyl-6, pyrimidyl-2, pyrimidyl-4, pyrimidyl-5, pyrazinyl-2, or pyrazinyl-3, or $R_1$ is phenyl, unsubstituted or mono- or polysubstituted by $R_2$, halogen, $OR_2$, $N(R_2)_2$, OAc, NHAc, or nitro or monosubstituted by lower alkylenedioxy; $R_2$ is H or alkyl of up to 4 carbon atoms; Y is $(-CH_2-)_m$, wherein $m$ is the integer 1, 2 or 3; Ac is the acyl radical of a carboxylic acid of up to 6 carbon atoms; Z is $(-CH_2-)_n$, wherein $n$ is the integer 0, 1 or 2; and the dotted line represents a second covalent bond which can be present or absent, and the physiologically acceptable acid addition salts thereof.

2. A compound of Claim 1 wherein A is H, Cl, $N(R_3)_2$, $NH-N(R_3)_2$; $R_1$ is furyl, thienyl, phenyl or phenyl mono-, di- or tri-substituted by one or more of methyl, hydroxy, methoxy, nitro, amino or acetylamino or monosubstituted by methylenedioxy; $R_3$ is H, $CH_3$, or $C_2H_5$; and $n$ is 0.

3. A compound of Claim 1 wherein A is H or $NH_2$; $R_1$ is thienyl, phenyl or phenyl substituted by methylenedioxy; Y is $-CH_2-$ or $-CH_2CH_2-$; and $n$ is 0.

4. A compound of Claim 3 wherein A is H and Y is $-CH_2-$.

5. A compound of Claim 3 wherein A is H; $R_1$ is phenyl or thienyl-2; Y is $-CH_2CH_2-$; and $n$ is 0.

6. A compound of Claim 1 wherein $R_1$ is alkyl of up to 6 carbon atoms or cycloalkyl of 3–6 carbon atoms, and $n$ is 0.

7. A compound of Claim 1 wherein A is H, F, Cl, $SR_2$, $OR_2$, $NH_2$, $NH-NH_2$ or $N_3$; $R_1$ is furyl-2, thienyl-2, phenyl, or phenyl mono-, di- or poly-substituted by one or more of halogen, methoxy, nitro, amino, or dimethylamino, or monosubstituted by methylenedioxy; and Y is $-CH_2-$ or $-CH_2CH_2-$.

8. A compound of Claim 1 wherein A is H, halogen, $SR_2$, $OR_2$, $N(R_2)_2$, $NHN(R_4)_2$ or $N_3$; $R_1$ is $CH_2OH$, alkyl, cycloalkyl of up to 6 carbon atoms; or cycloalkyl of 4–6 carbon atoms $COOR_2$, furyl-3, thienyl-3, tetrahydrofuryl, said 5- or 6-membered saturated or unsaturated ring containing 1 or 2 nitrogen atoms, phenyl or phenyl mono- or polysubstituted by $R_4$, $OR_2$, $N(R_4)_2$, OAc, or NHAc, or monosubstituted by the group

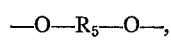
$-O-R_5-O-$, and, when A is $N(R_4)_2$, also furyl-2, thienyl-2 or phenyl, unsubstituted or mono-, di- or polysubstituted by halogen or nitro; $R_4$ is alkyl of up to 4 carbon atoms; $R_5$ is Y or $-C(R_2)_2-$, and $n$ is 0.

9. A compound of Claim 1, N(6)-(3-phenyl-norcamphanyl-2)-adenosine.

10. A compound of Claim 1, N(6)-[3-furyl-2)-norcamphanyl-2]-adenosine.

11. A compound of Claim 1, N(6)-[3-(thienyl-2)-norcamphanyl-2]-adenosine.

12. A compound of Claim 1, N(6)-[3-(o-tolyl)-norcamphanyl-2]-adenosine.

13. A compound of Claim 1, N(6)-[3-(p-tolyl-norcamphanyl-2]-adenosine.

14. A compound of Claim 1, N(6)-[3-(3,4-dimethoxyphenyl)-norcamphanyl-2]-adenosine.

15. A compound of Claim 1, N(6)-[3-(3,4,5-trimethoxyphenyl)-norcamphanyl-2]-adenosine.

16. A compound of Claim 1, N(6)-[3-(3,4-dihydroxyphenyl)-norcamphanyl-2]-adenosine.

17. A compound of Claim 1, N(6)-[3-p-nitrophenyl)-norcamphanyl-2]-adenosine.

18. A compound of Claim 1, N(6)-[3-(p-aminophenyl)-norcamphanyl-2]-adenosine.

19. A compound of Claim 1, N(6)-[3-(3,4-methylenedioxyphenyl)-norcamphanyl-2]-adenosine.

20. A compound of Claim 1, N(6)-(3-phenyl-norcamphanyl-2-methyl)-adenosine.

21. A compound of Claim 1, N(6)-(3-phenyl-bicyclo[2,2,2]octyl-2)-adenosine.

22. A compound of Claim 1, N(6)-[3-(thienyl-2)-bicyclo(2,2,2)octyl-2]-adenosine.

23. A compound of Claim 1, N(6)-[3-(o-tolyl)-bicyclo(2,2,2)octyl-2]-adenosine.

24. A compound of Claim 1, N(6)-[3-(p-tolyl)-bicyclo(2,2,2)octyl-2]-adenosine.

25. A compound of Claim 1, N(6)-[3-(3,4,5-trimethoxyphenyl)-bicyclo(2,2,2)octyl-2]-adenosine.

26. A compound of Claim 1, N(6)-[3-(3,4-methylenedioxyphenyl)-bicyclo(2,2,2)octyl-2]-adenosine.

27. A compound of Claim 1, N(6)-(3-phenyl-norcamphanyl-2)-2-chloroadenosine.

28. A compound of Claim 1, N(6)-[3-(3,4-dimethoxyphenyl)-norcamphanyl-2]-2-chloroadenosine.

29. A compound of Claim 1, N(6)-[3-phenyl-bicyclo(2,2,2)octyl-2]-2-chloroadenosine.

30. A compound of Claim 1, N(6)-(3-phenyl-norcamphanyl-2)-2-aminoadenosine.

31. A compound of Claim 1, N(6)-[3-(thienyl-2-norcamphanyl-2]-2-aminoadenosine.

32. A compound of Claim 1, N(6)-[3-(3,4-dimethoxyphenyl)-norcamphanyl-2]-2-aminoadenosine.

33. A compound of Claim 1, N(6)-[3-(3,4,5-trimethoxyphenyl)-norcamphanyl-2]-2-aminoadenosine.

34. A compound of Claim 1, N(6)-[3-(3,4-dihydroxyphenyl)-norcamphanyl-2]-2-aminoadenosine.

35. A compound of Claim 1, N(6)-[3-(3,4-methylenedioxyphenyl)-norcamphanyl-2]-2-aminoadenosine.

36. A compound of Claim 1, N(6)-[3-phenyl-bicyclo(2,2,2)octyl-2]-2-aminoadenosine.

37. A compound of Claim 1, N(6)-[3-(thienyl-2)-norcamphanyl-2]-2-dimethylaminoadenosine.

38. A compound of Claim 1, N(6)-[3-(3,4-dimethoxyphenyl)-norcamphanyl-2]-2-dimethylaminoadenosine.

39. A compound of Claim 1, N(6)-[7-phenyl-bicyclo(3,2,2)nonyl-6]-adenosine.

40. A compound of Claim 1, N(6)-[7-(3,4-methylenedioxyphenyl)-bicyclo(3,2,2)nonyl-6]-adenosine.

41. A compound of Claim 1, N(6)-(3-phenyl-norcamphanyl-2)-2-hydrazinoadenosine.

42. A compound of Claim 1, N(6)-[3-phenyl-bicyclo(2,2,1)hepten-5-yl-2]-adenosine.

43. A compound of Claim 1 wherein $R_1$ is phenyl monosubstituted by methylenedioxy.

44. A compound of Claim 1 wherein A is fluorine or chlorine.

References Cited

UNITED STATES PATENTS 3,471,472   10/1969   Thiel et al. _____ 260—211.5 R
3,590,029   6/1971    Koch et al. _____ 260—211.5 R JOHNNIE R. BROWN, Primary Examiner U.S. Cl. X.R.

424—180

UNITED STATES PATENT OFFICE
CERTIFICATE OF CORRECTION

Patent No. 3,838,147    Dated September 24, 1974

Inventor(s) Rolf Pohlke, et al.

It is certified that error appears in the above-identified patent and that said Letters Patent are hereby corrected as shown below:

IN THE CLAIMS:

CLAIM 8, COLUMN 22, LINE 3 OF THE CLAIM:

Delete ",cycloalkyl", first occurrence.

Signed and sealed this 31st day of December 1974.

(SEAL)
Attest:

McCOY M. GIBSON JR.
Attesting Officer

C. MARSHALL DANN
Commissioner of Patents